(12) United States Patent
Li et al.

(10) Patent No.: US 7,381,495 B2
(45) Date of Patent: Jun. 3, 2008

(54) DIY THIN FILM BATTERY

(75) Inventors: Wen-Jin Li, Hsinchu (TW);
Kuan-Liang Chen, Hsinchu (TW);
Min-Lun Chen, Hsinchu (TW);
Shinn-Horng Yeh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 965 days.

(21) Appl. No.: 10/850,333

(22) Filed: May 20, 2004

(65) Prior Publication Data

US 2005/0130036 A1  Jun. 16, 2005

(30) Foreign Application Priority Data

Dec. 16, 2003  (TW) .............................. 92135610 A

(51) Int. Cl.
*H01M 6/12* (2006.01)
*H01M 6/18* (2006.01)

(52) U.S. Cl. ...................................... 429/162; 429/317
(58) Field of Classification Search ................ 429/162, 429/317

See application file for complete search history.

*Primary Examiner*—Patrick Ryan
*Assistant Examiner*—Thomas H. Parsons
(74) *Attorney, Agent, or Firm*—Rabin & Berdo, P.C.

(57) ABSTRACT

A do-it-yourself (DIY) thin film battery provides battery assembling components suitable for separate storage and easy fabrication. With through hole plating or sidewall plating, the current collectors of the anode and cathode, extend from one side of the substrates to the other to facilitate electric coupling with the electronic product outside. Through either soldering or direct contact with conductive tapes, the battery components mount with each other. Thus, the battery components can be combined to have batteries of various voltages and capacities via series or parallel connection means without extra circuits.

20 Claims, 6 Drawing Sheets

DIY THIN FILM BATTERY

BACKGROUND OF THE INVENTION

1. Field of Invention

The present invention pertains to a thin film battery and particularly to a thin film battery where components thereof may be separately stored and assembled by a consumer.

2. Related Art

For an electronic product, a battery is often an apparent choice of power source. In the case of a small appliance, the adopted battery with desired specification may be available in some shops. The thin film batteries are also acquired for products like cellular phones, personal digital assistant (PDAs) and the like.

Nevertheless, the prior art of batteries has its disadvantage. Refer to FIG. 1, the typical prior battery is obtained by sequentially stacking an anode substrate 10a, an anode current collector 11a, an anode active layer 13a, a separator 14, a cathode active layer 13b, a cathode current collector 11b and a cathode 10b together. Then, the thus formed stack is packaged and sealed to complete the formation of a battery. Since the conventional battery is fabricated as a single body with fixed specification, once connected in parallel or series, external circuits are necessary to be used between or among the batteries to meet the connection requirement.

Furthermore, a typical battery is a perishable product and deteriorates as a result of chemical action that proceeds during storage. The self-discharge characteristics of conventional battery systems cause a reduction in capacity. In order to extend the shelf life of a battery, it is necessary to minimize the self-discharge reaction in the battery system.

SUMMARY OF THE INVENTION

In response to the aforementioned problems for the prior battery, present invention provides a thin film battery where components thereof may be separately stored and assembled by a consumer.

The do-it-yourself (DIY) thin film battery primarily comprises an anodic component, a cathodic component and a solid electrolyte film. In the battery, the anodic component can be individually stored and comprises an anode substrate, an anode current collector, an anode current collector extension and an anode active layer. The anode substrate has a first side and a second side at which the anode current collector and the anode current collector extension are respectively located, and both collectors are electrically connected. The anode active layer is disposed at an outer surface of the anode current collector, which is closely contacted with the solid electrolyte film.

The cathodic component can also be individually stored and comprises a cathode substrate, a cathode current collector, a cathode current collector extension and a cathode active layer. The cathode substrate has a first side and a second side at which the cathode current collector and the cathode current collector extension are respectively located, and the cathode current collector extension is electrically connected with the cathode current collector. The cathode active layer is disposed at an outer surface of the cathode current collector, which is also closely contacted with the solid electrolyte film.

The present invention achieves the advantages of allowing the components of the thin film battery to be separately stored and assembled by a consumer.

BRIEF DESCRIPTION OF THE DRAWINGS

The present invention will be fully understood from the detailed description given hereinbelow for illustration only, and thus are not limitative of the present invention, and wherein.

DETAILED DESCRIPTION OF THE INVENTION

Figure 1:
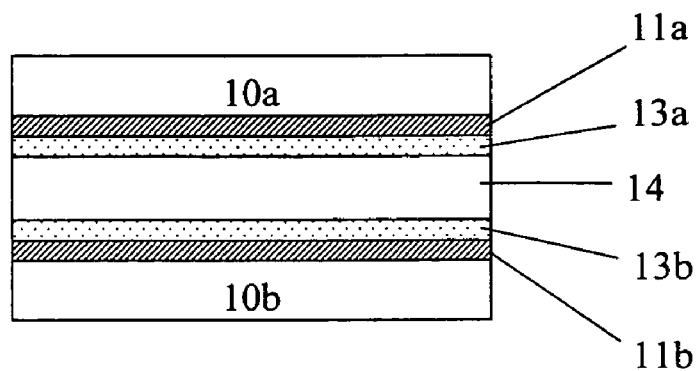
FIG. 1 illustrates a prior battery structure.
Figure 2:
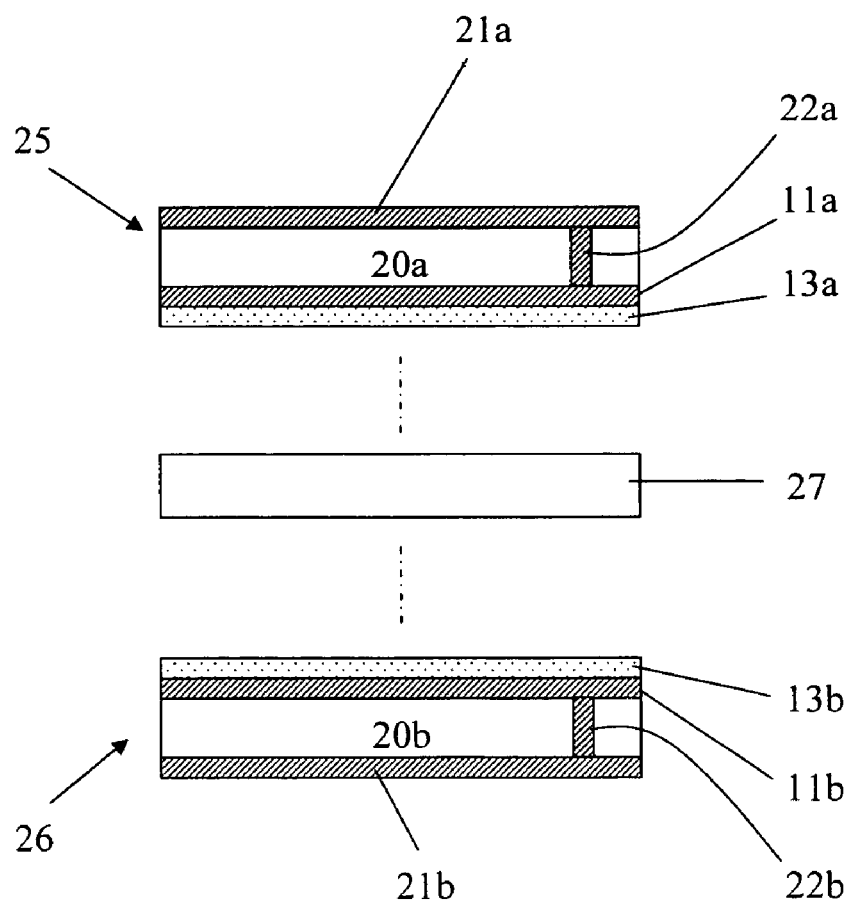
FIG. 2 illustrates a cross section of the first embodiment according to the present invention.
Figure 3:
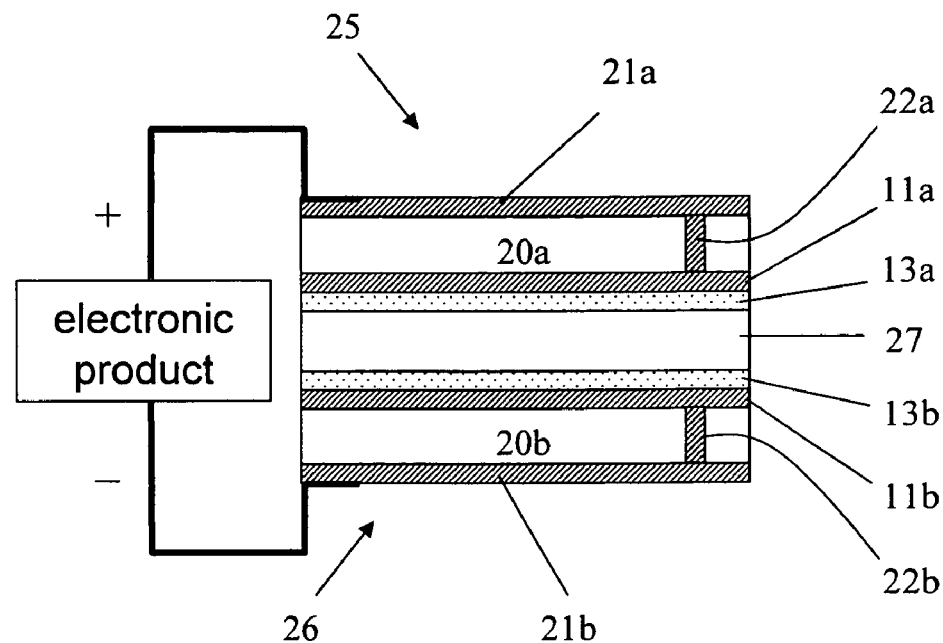
FIG. 3 illustrates a use of the first embodiment according to the present invention.

Refer to FIGS. 2 and 3, the first embodiment of the present invention comprises an anodic component 25, cathodic component 26 and solid electrolyte film 27, where:

(1) The Anodic Component 25 Comprises

A. an anode substrate 20a having a first side (the bottom side in the corresponding drawing) and a second side (the top side in the corresponding drawing), and being made of plastic material layer such as PE, PP, PET or metal foil, or paper.

B. an anode current collector 11a, being a metal and located at the first side of the anode substrate 20a.

C. an anode current collector extension 21a located at the second side of the anode substrate 20a, being electrically connected to the current collector 11a by a through hole plating 22a or a sidewall plating (not illustrated in the drawing) of the anode substrate 20a so that the anode current collector extension 21a may serve as an extended anode to be electrically coupled with an external electronic device.

D. an anode active layer 13a located at the surface of the anode current collector 11a, being made of electroactive metals such as Zn, Ni, Ag and Cd.

(2) The Cathodic Component 26 Comprises

A. a cathode substrate 20b having a first side (the top side in the corresponding drawing) and a second side (the bottom side in the corresponding drawing) and being made of metal foil or plastic material layer such as PE, PP, PET, or paper.

B. a cathode current collector 11b located at the first side of the cathode substrate 20b.

C. a cathode current collector extension 21b located at the second side of the cathode substrate 20b, being electrically connected to the cathode current collector 11b by a through hole plating 22b or a sidewall plating (not illustrated in the drawing) of the cathode substrate 20b so that the cathode current collector extension 21b may be electrically coupled with the afro-mentioned external electronic device. Noting that the amount of the through hole plating 22b is not limited and the through hole plating 22b or the sidewall plating will not be used when the anode substrate 20a or cathode substrate 20b are made of metal.

D. a cathode active layer 13b located at the surface of the cathode current collector 11b being made of $MnO_2$, C, $AB_5$ or $Ag_2O$.

(3) A Solid Electrolyte Film 27 Being Made of PEO, PVA or PAA, or the Like

The anodic component 25, the cathodic component 26 and the solid electrolyte film 27 may be stored separately. To assemble them, the consumer only needs to assemble them into the structure as shown in FIG. 3 where the two sides of the solid electrolyte film 27 contacts the anode active layer 13a and the cathode active layer 13b respectively so that there exists chemical reaction in between. Furthermore, the potential difference measured between the anode current collector 11a and the cathode current collector 11b caused by the chemical reaction generates electricity and serves as the power source.

Since the through hole plating or the sidewall plating and the current collector extensions at the outer surface of the substrate are used in the inventive DIY thin film battery, a consumer may achieve in series or parallel combination of components between or among the components of the battery by soldering or by conductive tapes. In such case, a consumer may obtain a battery with various capacity and voltage as his demand. Some of the batteries may also be connected in parallel or in series without a need of extra external circuit when forming a complete battery.

The following embodiments are presented to illustrate other aspects of the present invention.

Figure 4:
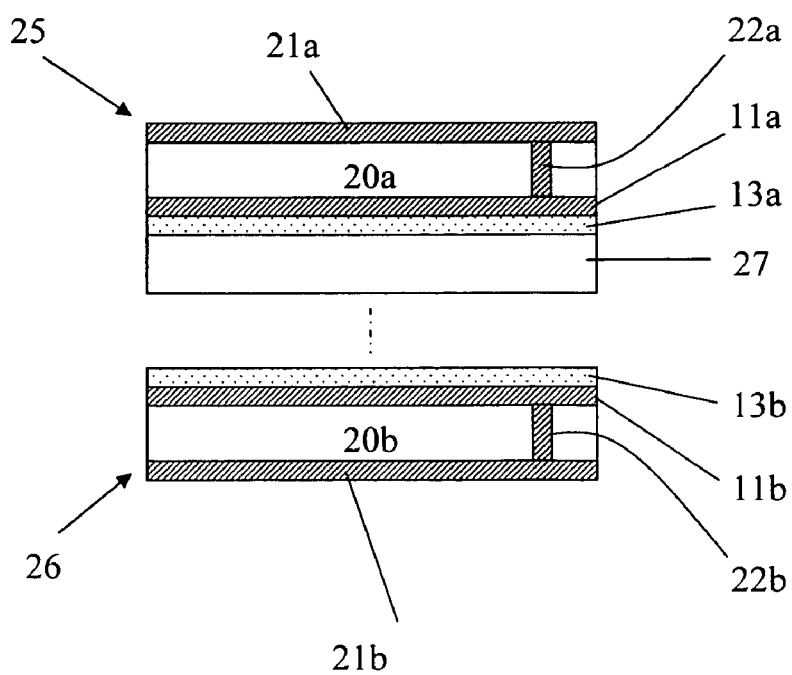
FIG. 4 illustrates a cross section of the second embodiment according to the present invention.
Figure 5:
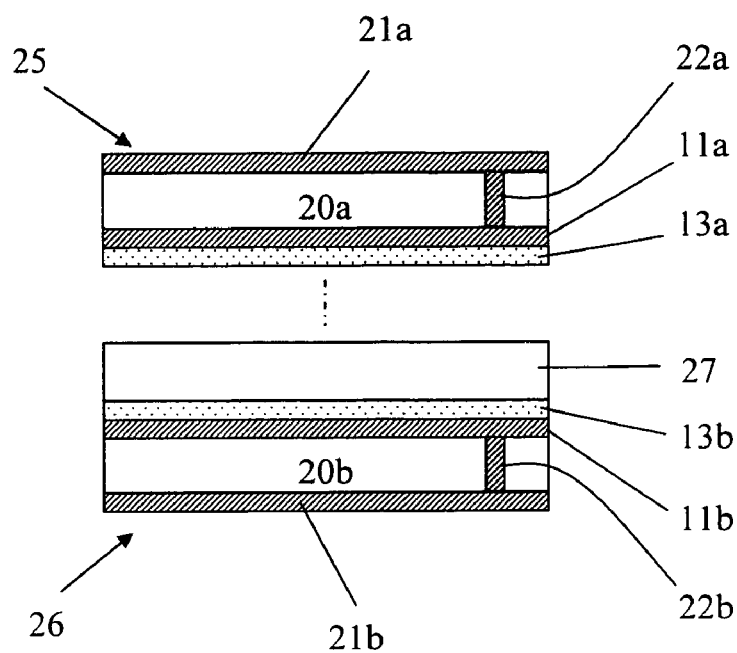
FIG. 5 illustrates a cross section of the third embodiment according to the present invention.

Refer to FIG. 4, the second embodiment of the invention combines the anodic component 25 and the solid electrolyte film 27 into one integrated body and the integrated body and the cathodic component 26 are stored separately. Meanwhile, in the third embodiment of the present invention as shown in FIG. 5, the solid electrolyte film 27 and the cathodic component 26 are combined into one integrated body and the body and the anodic component 25 are stored separately.

Figure 6:
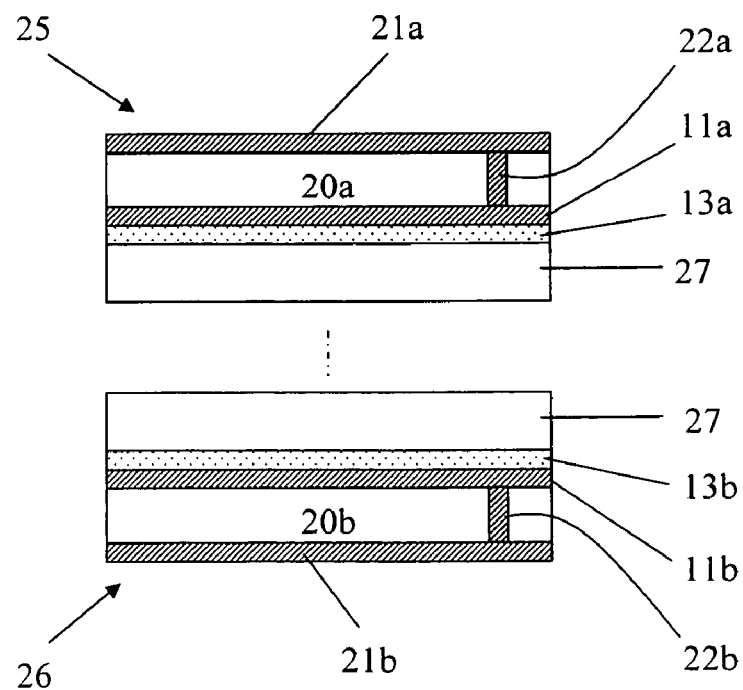
FIG. 6 illustrates a cross section of the fourth embodiment according to the present invention.

FIG. 6 illustrates the fourth embodiment of the present invention. As shown in the drawing, the solid electrolyte film 27 is integrated onto the anodic component 25 and the cathodic component 26 respectively. In other words, one electrolyte film 27 is fabricated onto the surface of the anodic activated layer 13a while another electrolyte film 27 is fabricated onto the surface of the cathodic active layer 13b. By doing so, any of the anodic component 25 and cathodic component 26 integrated elements may be bonded together to form a complete battery.

Figure 7:
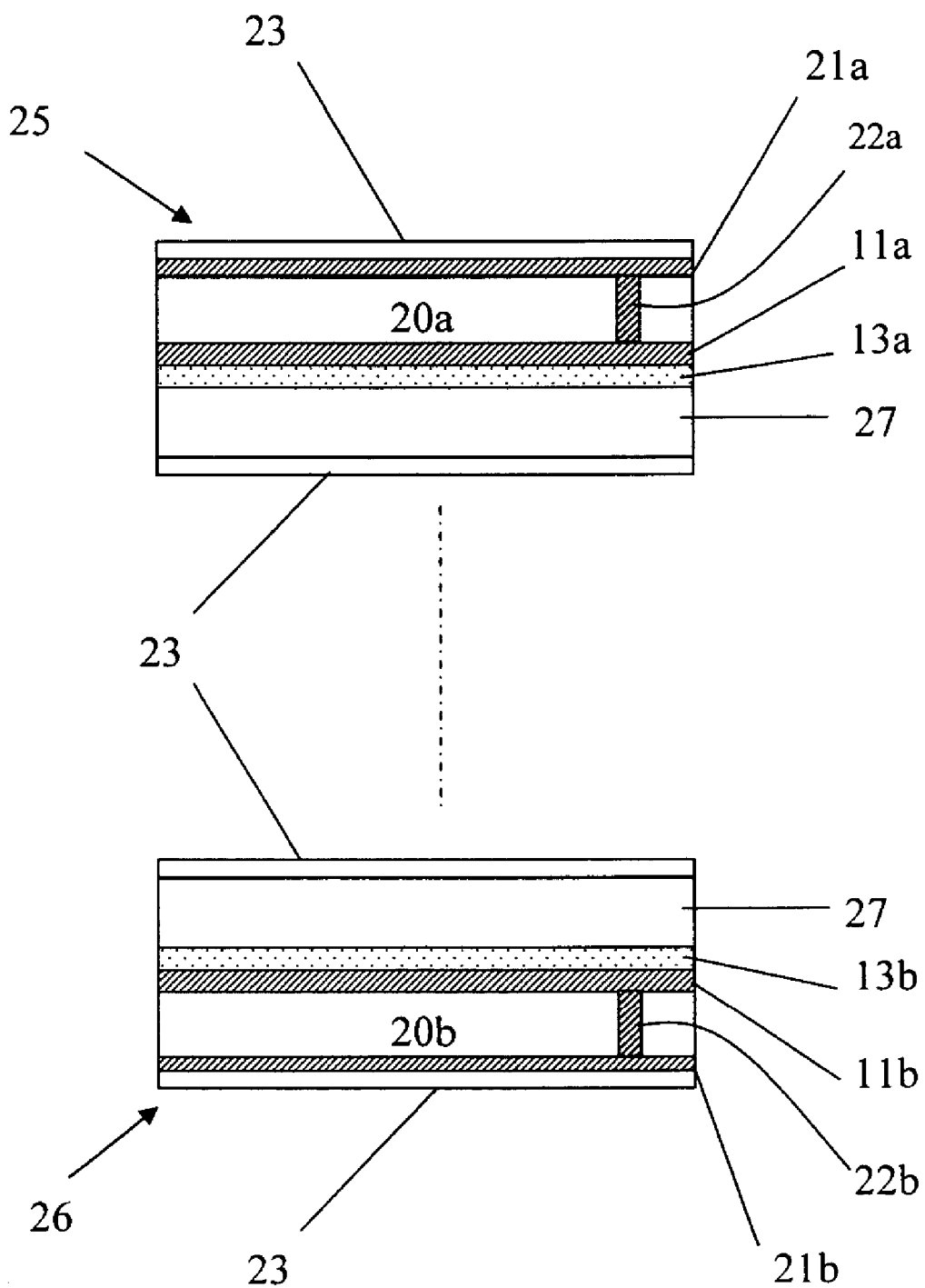
FIG. 7 illustrates a cross section of the fifth embodiment according to the present invention.

To protect of the battery components during storage, a fifth embodiment of the present invention is set forth wherein a protection film 23 is provided. As shown in FIG. 7, the protection layer 23 may be disposed on a surface of the anode current collector extension 21a for protection purpose. Alternatively, the protection layer 23 may be disposed on the surface of the solid electrolyte film 27 of the anodic component 25 for the same purpose. Similarly, the protection layer 23 may also be disposed at the surface of the cathodic current collector extension 21b and the surface of the solid electrolyte film 27.

Figure 8:
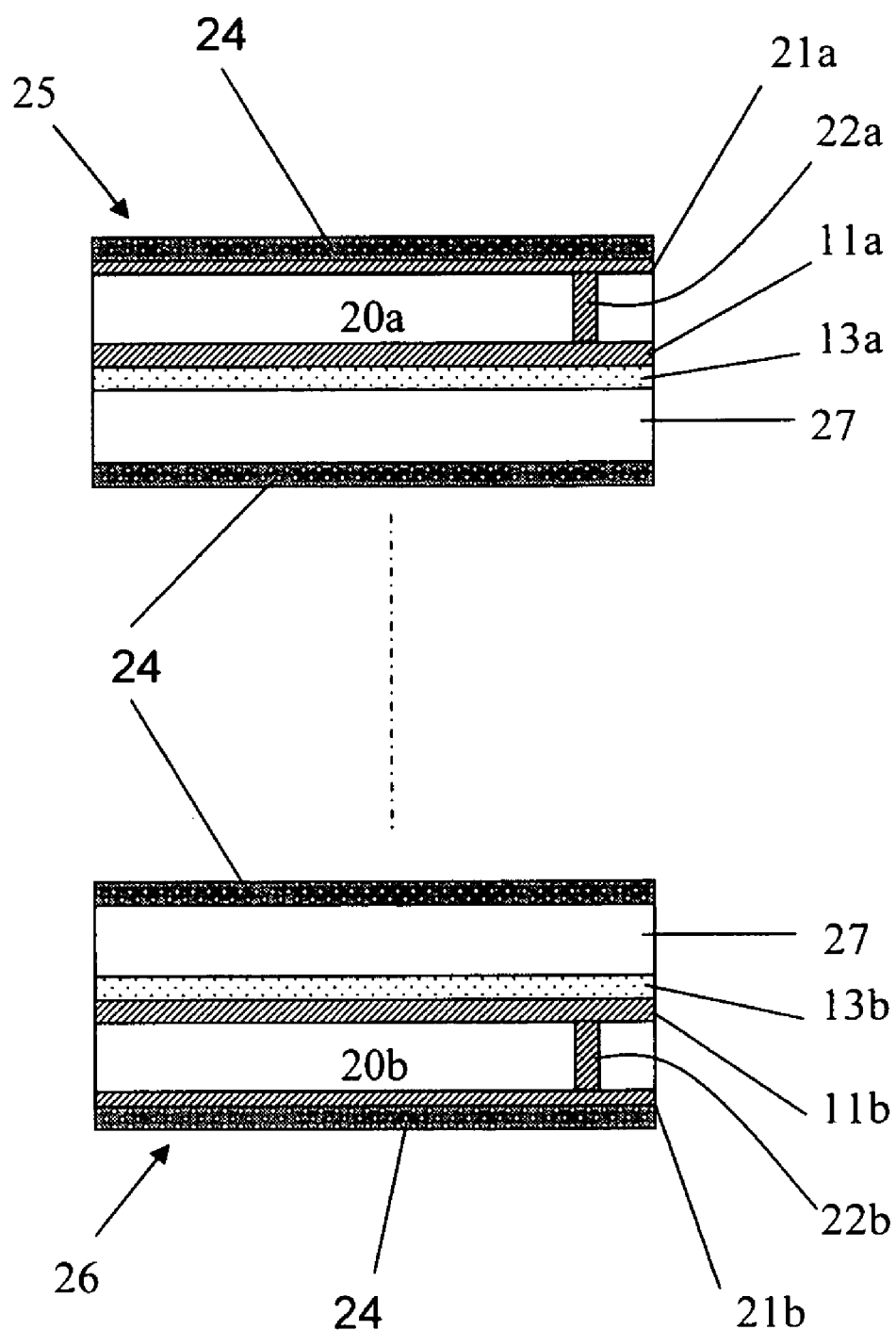
FIG. 8 illustrates a cross section of the sixth embodiment according to the present invention.

The battery components may use a conductive viscose 24 (or a conductive ion viscose) as a choice to achieve bonding between the components instead of applying the currently used packaging technology. As shown in FIG. 8, which shows a sixth embodiment of the present invention, an electron-conducting viscose 24 is coated at the surface of the anodic current collector extension 21a and laid for bonding with an external electronic device. On the other hand, the formed battery may be connected with another thus formed battery in series or in parallel. In addition, an ion-conducting viscose is coated at the surface of the solid electrolyte film 27 of the anodic component 25, so that the electrolyte film 27 may be bonded with the anode component 25. In the same manner, the cathode component 26 may be applied with electron-conducting viscose and ion-conducting viscose 24 at the cathodic current collector extension 21b as well as the surface of the solid electrolyte film 27 respectively.

Figure 9:
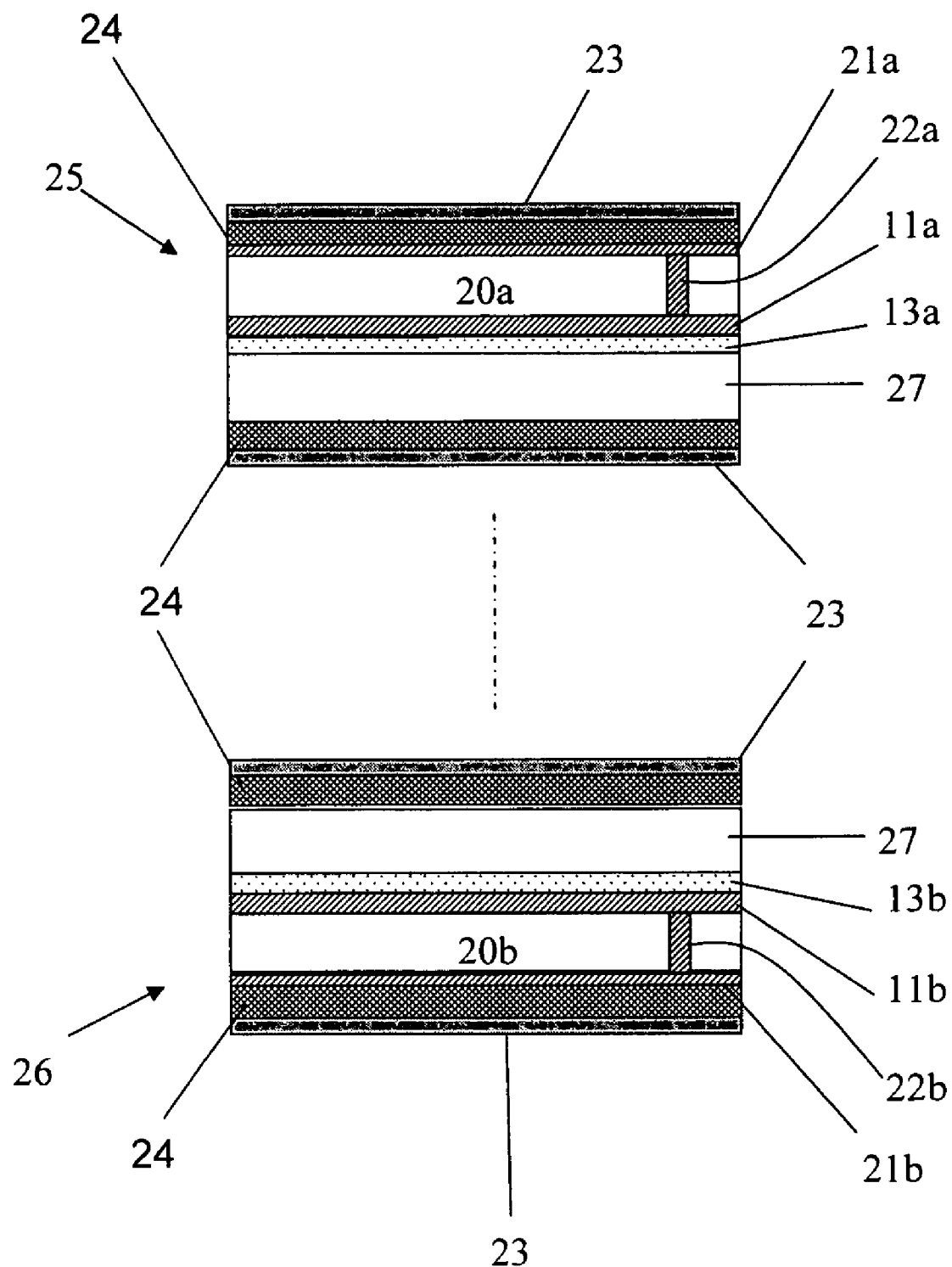
FIG. 9 illustrates a cross section of the seventh embodiment according to the present invention.

Preferably, the conductive viscose coating battery components are to be stored with a protection layer as shown in FIG. 9. FIG. 9 illustrates a seventh embodiment, where a protection layer 23 (may be torn off) is applied at the surface of the electron-conducting/ion-conducting viscose 24 on all regions. In this case, individual components of the battery that is stored separately may be protected.

The application of the protection layer 23 and the conductive viscose 24 is substantially achieved by "conductive tapes" and is illustrated in FIG. 6. The same is applicable to the components in FIG. 2-5.

Further, the technology of the present invention may achieve in-series connection by alternative stacking of the anodic and cathodic components so that the battery provides a higher voltage (not shown). In the case of connection in parallel, several components are bonded in a manner that one of the anodic components is connected to the anodic components of the other battery (batteries) using electron-conducting tape sheets. At the same time, the cathodic components of these batteries are bonded with the same manner (not shown). Thus, a higher capacity of battery is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An do-it-yourself (DIY) thin film battery comprising:
at least one solid electrolyte film that can be stored separately;
an anodic component that can be separately stored, including an anode substrate, an anode current collector, an anode current collector extension and an anode active layer, wherein the anode substrate has a first side and a second side where the anode current collector and the anode current collector extension are respectively located, the anode current collector extension being electrically connected with the anode current collector, and the anode active layer being disposed at an outer surface of the anode current collector and being connected with the solid electrolyte film; and
a cathodic component that can be separately stored, including a cathode substrate, a cathode current collector, a cathode current collector extension and a cathode active layer, wherein the cathode substrate has a first side and a second side where the cathode current collector and the cathode current collector extension are respectively located, the cathode current collector extension being electrically connected with the cathode current collector, and the cathode active layer being disposed at an outer surface of the cathode current collector, and being connected with the solid electrolyte film;
wherein the solid electrolyte film, the anodic component and the cathode component are stacked together so that surfaces of the solid electrolyte film are in contact with the anode active layer and the cathode active layer respectively to generate a chemical reaction as well as a potential difference between the anode current collector and the cathode current collector.

2. The DIY thin film battery recited in claim 1, further comprising at least a through hole plating located in the anode substrate, the through hole plating being electrically connected to the anode current collector extension and the anode current collector.

3. The DIY thin film battery recited in claim 1, further comprising at least a sidewall plating located in the anode substrate, the sidewall plating being electrically connected to the anode current collector extension and the anode current collector.

4. The DIY thin film battery recited in claim 1, further comprising at least a through hole plating located in the cathode substrate, the through hole plating being electrically connected to the cathode current collector extension and the cathode current collector.

5. The DIY thin film battery recited in claim 1, further comprising at least a sidewall plating located in the cathode substrate, the sidewall plating being electrically connected to the cathode current collector extension and the cathode current collector.

6. The DIY thin film battery recited in claim 1, further comprising a removable protection layer selectively disposed at outer surfaces of the anode current collector extension, the anode active layer, the cathode current collector extension, the cathode active layer and the solid electrolyte film.

7. The DIY thin film battery recited in claim 1, further comprising an electron-conducting viscose or an ion-conducting viscose selectively disposed at the outer surfaces of the anode current collector extension, the anode active layer, the cathode current collector extension, the cathode active layer and the solid electrolyte film.

8. The DIY thin film battery recited in claim 7, further comprising a protection layer being disposed at a surface of the electron-conducting viscose or the ion-conducting viscose.

9. The DIY thin film battery recited in claim 1, wherein the solid electrolyte film is pre-integrated with the anodic component.

10. The DIY thin film battery recited in claim 9, further comprising a removable protection layer selectively disposed at the surface the anode current collector extension, the anode activation material, the cathode current collector extension, the cathode activation material and the solid electrolyte film.

11. The DIY thin film battery recited in claim 9, further comprising an electron-conducting viscose or an ion-conducting viscose selectively disposed at the outer surfaces of the anode current collector extension, the anode active layer, the cathode current collector extension, the cathode active layer and the solid electrolyte film.

12. The DIY thin film battery recited in claim 11, further comprising a protection layer disposed at a surface of the electron-conducting viscose or the ion-conducting viscose.

13. The DIY thin film battery recited in claim 1, wherein the solid electrolyte film and the cathodic component are pre-integrated together.

14. The DIY thin film battery recited in claim 13, further comprising a protection layer selectively disposed at the outer surfaces of the cathode current collector extension and the solid electrolyte film.

15. The DIY thin film battery recited in claim 13, further comprising an electron-conducting viscose or an ion-conducting viscose selectively primed at the surface of the cathode electrolyte metal extension and the solid electrolyte film.

16. The DIY thin film battery recited in claim 15, further comprising a protection layer disposed at the surface of the electron-conducting viscose or the ion-conducting viscose.

17. The DIY thin film battery recited in claim 1, wherein the solid electrolyte film is made of PEO, PVA or PAA.

18. The DIY thin film battery recited in claim 1, wherein a plurality of the DIY thin film batteries is connected in series.

19. The DIY thin film battery recited in claim 1, wherein a plurality of the DIY thin film batteries are connected in parallel.

20. The DIY thin film battery recited in claim 1, wherein the cathode substrate or the anode substrate is a metal substrate.

* * * * *